June 7, 1932. W. J. GABEL 1,861,691

AUTOMOBILE BUMPER

Filed June 12, 1931

William J. Gabel, Inventor

By [signature]

Attorney

Patented June 7, 1932

1,861,691

UNITED STATES PATENT OFFICE

WILLIAM J. GABEL, OF GREAT FALLS, MONTANA, ASSIGNOR OF FIFTY PER CENT TO JOHN S. BRETZ, OF GREAT FALLS, MONTANA

AUTOMOBILE BUMPER

Application filed June 12, 1931. Serial No. 543,985.

This invention relates to new and useful improvements in bumpers, and particularly to bumpers for automobiles.

One object of the present invention is to provide a bumper which will more properly absorb the jars and shocks, incident to impact with an object, than with similar devices heretofore.

Another object is to provide a device of this character which will protect the front wheels and the mudguards thereof, from damage, in a collision.

Other objects and advantages will be apparent from the following description, when taken in connection with the accompanying drawing.

Figure 1:
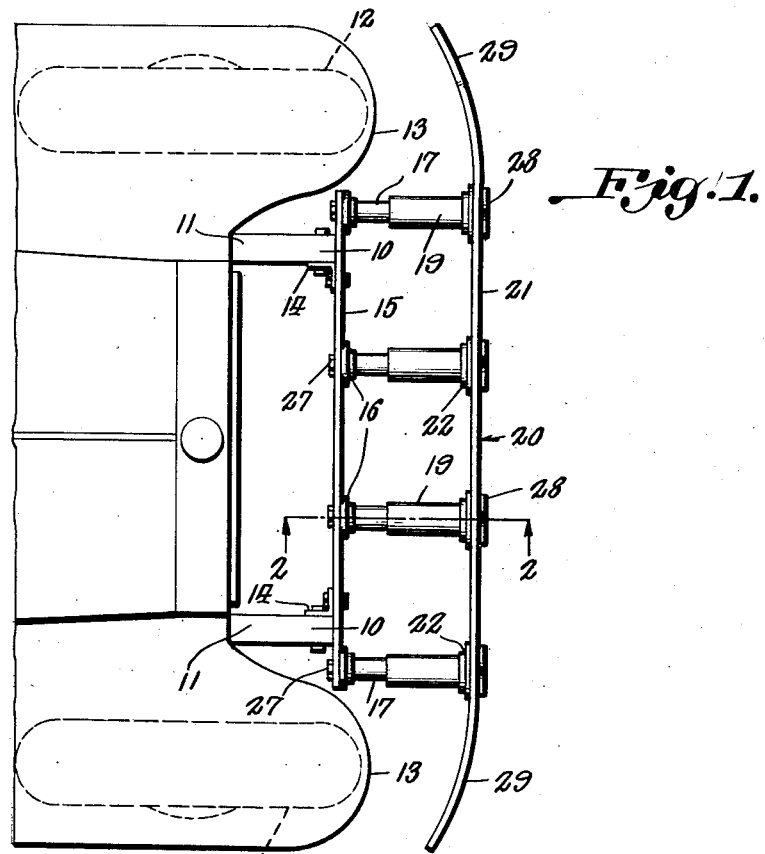
Figure 1 is a top plan view of the bumper, in connection with the front portion of an automobile.
Figure 2:
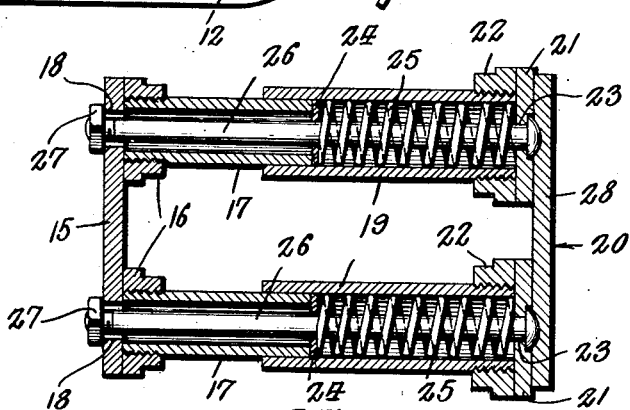
Figure 2 is a vertical sectional view on the line 2—2 of Figure 1, enlarged.

Referring particularly to the accompanying drawing, 10 represents the horns, or front end portions of the side bars 11, of the chassis of an automobile, such automobile also including the front wheels 12, and the front mudguards 13.

Carried by these horns 10 are the forwardly extending brackets 14, to which is bolted a metal plate 15, which extends transversely of the front of automobile, and being of a length slightly greater than the width of the chassis. Carried by the front face of the said plate 15, and extending forwardly therefrom, are the internally threaded members 16. It will be noted that there are two transverse rows of the members 16, arranged one above the other, and being equally spaced. Screwed into each of the members 16 is one end of a forwardly extending tubular member 17, the forward and rear ends of which are open, as shown, the rear end thereof registering with an opening 18, formed in said plate 15. Telescoped on each of the said tubular members 17 is a slightly larger tubular member 19, the forward end of each of which is externally threaded. Disposed transversely of the front of the automobile, at a suitable distance therefrom, is the bumper, represented as a whole by the numeral 20, and comprising the two bars 21, each having on its rear face a series of internally threaded members 22, similar to the members 16, and corresponding in number thereto, and arranged in alinement therewith, to receive the beforementioned threaded ends of the tubular members 19. Each of the bars 21 is formed with the openings 23, registering with the central opening of a member 16. Disposed within the rear end of each of the tubular members 19, and resting against the forward end of the associated member 17, is a washer plate 24, and disposed in each of the tubes 19, forwardly of said washer, is a coil spring 25, the rear end of which bears against said washer plate. Disposed longitudinally through the tubular members 17 and 19, and through the center of the spring 25, is a bolt 26, the head of which is partly countersunk into the front face of a bumper bar 21, while its rear end passes through one of the beforementioned openings 18, in the plate 15, and carries thereon, rearwardly of said plate, a nut 27. By turning the nuts 27, the tubular members 17 and 19 may be caused to telescope to greater or lesser degrees, whereby to regulate the tension of the coil springs. Suitable plates 28 are secured to the front faces of the bumper bars 21, in spanning relation to the space therebetween, and in covering relation to the heads of the bolts 26.

Upon impact of the bumper bars 21, with an object, such bars will move rearwardly, forcing the tubular members 19 back, whereby to compress the springs 25, thereby absorbing the shock incident to such impact. It will be seen that the bolts will be forced rearwardly through the openings 18, of the plate 15, the heads of said bolts being securely held by the covering plates 28.

The ends of the bumper bars 21 are slightly curved rearwardly, as at 29, and lie forward of, and transversely of the mudguards 13, whereby to protect the same from injury.

While I have illustrated the bumper device as applied to the front of an automobile, it will, of course, be understood that the same device may be readily attached to the rear of the automobile.

What is claimed is:

1. An automobile bumper comprising an attaching plate having openings therein and threaded socket members surrounding said openings, a bumper bar spaced from the attaching plate and having openings corresponding in position to the openings of said plate, threaded socket members surrounding the bumper bar openings, telescoped tubular members disposed between the plate and bar and threaded respectively into the sockets of said plate and bar, springs within the tubular members, and bolts disposed through the tubular members and springs, one end of each of the bolts being held by the bumper bar while the other end is slidably disposed through the plate opening.

2. An automobile bumper comprising an attaching plate having openings therein, a bumper bar spaced from the attaching plate and having openings corresponding in position to the openings of said plate, telescoped tubular members disposed between the plate and bar and secured respectively to said plate and bar, springs within the tubular members, and bolts disposed through the tubular members and springs, one end of each of the bolts being held by the bumper bar while the other end is slidably disposed through the plate opening.

In testimony whereof, I affix my signature.

WILLIAM J. GABEL.